Patented Jan. 9, 1945

2,366,970

UNITED STATES PATENT OFFICE 2,366,970

PRINTING INK CONTAINING ZEIN

John W. Kroeger and Harry F. O'Connor, Philadelphia, Pa., assignors to Fred'k H. Levey Co., Inc., New York, N. Y., a corporation of New York No Drawing. Application October 25, 1941, Serial No. 416,523

4 Claims. (Cl. 260—6)

This invention relates to quick drying printing inks and particularly to inks designed to permit rapid drying of printed impressions by the application of heat, as for example by directing steam upon the printed impression.

Quick drying inks as originally developed for commercial printing operations consisted of a pigment suspended in a vehicle prepared by dissolving a suitable resin in a solvent having a low vapor pressure at ordinary press room temperatures and a relatively high vapor pressure at higher temperatures, so that the solvent may be evaporated rapidly by the application of heat to a printed impression. Such inks have had extended commercial application but have the disadvantage that relatively high temperatures are required to set the ink and that it is necessary to withdraw the vapors which may be toxic continuously from the press room. In large scale operations, the discharge of such vapors to the surrounding atmosphere may constitute a nuisance.

To avoid such difficulties, inks have been developed which include water insoluble resins having in solution a low water tolerance so that they may be precipitated by the application of steam to the printed impression. Several such substances are available, including a resin comprising a natural rosin modified with an alpha beta unsaturated organic poly-basic acid, such as maleic or fumaric acid, by a diene reaction, sold by American Cyanamid & Chemical Corporation under the trade name "Teglac 127," and zein, which is sold as "Mazein" by Corn Products Company. The mechanism of precipitation of the resin from such inks makes them subject necessarily to conditions of humidity. It has been found that such inks will precipitate on the distributing system and on the printing plates if the humidity of the press room is as high as 50%, a condition which frequently exists, and that the difficulty increases as the humidity rises. Drying of the ink on the distributing system and printing plates entails frequent cleaning of the press, since otherwise the printing becomes inferior and the printing plates are subject to substantial damage.

It is the object of the present invention to afford simple and relatively inexpensive ink compositions which are not subject to the disadvantages hereinbefore described, but nevertheless permit rapid drying of the printed impression by the application of heat at relatively low temperatures, as for example by directing steam upon the printed impression.

Other objects and advantages of the invention will be apparent as it is better understood by reference to the following specification, in which the preferred embodiments of the invention are described. The examples hereinafter set forth are not exhaustive of the possibilities of the invention and are intended merely to be illustrative of the application of the principles thereof.

We have discovered that, by combining water soluble resins with resins of the type hereinbefore described, we are able to avoid premature precipitation and drying of the ink on the distributing system and printing plates. It would not be assumed from the properties of the materials that water soluble resins would be useful in ink compositions designed to be dried by the application of steam, since the solubility of the resins would appear to preclude drying under such conditions. Nevertheless we have found that the addition of substantial proportions of water soluble resins to ink compositions including resins which have a limited water tolerance and are adapted to be precipitated by the action of steam affords a very marked improvement in the properties of the inks produced.

A number of water soluble resins are available, but it has not been possible to determine the value of every such resin. We have, however, conducted extensive experiments with certain of these resins as hereinafter described in more detail. These resins include a water soluble resin obtained by condensing acetone with formaldehyde in the presence of sodium or potassium carbonate, water soluble phenol formaldehyde resins "Amberlite PR–14," "Amberlite PR–23" and "Amberlite PR–28," obtainable from Resinous Products & Chemical Co., Uformite 405, an aqueous solution of a urea-formaldehyde resin supplied by Resinous Products & Chemical Co., and "Carbowax 4000" and "Carbowax 1500," water soluble waxy materials having many properties of resins, made by repeating ethylene glycol ether units. Both "Carbowax 4000" and "Carbowax 1500" have the probable chemical formula $HO-C_2H_4-O(C_2H_4O)_x-C_2H_4OH$. "Carbowax 4000" has an approximate average molecular weight of 4000, and "Carbowax 1500" has an approximate average molecular weight of 1500. Both are obtainable from Carbide & Carbon Chemicals Corp.

The acetone formaldehyde resin may be prepared, for example, by adding 32.2 grams of potassium carbonate (anhydrous) to 970.0 grams of 37% formaldehyde, and stirring until the mixture is dissolved. To this solution, 290.0 grams of acetone are added, and the resulting clear solution is stirred for 44 hours at 25–27° C. The water is then removed by evaporation under vacuum. A yield of 585 grams of thick syrup is obtained, the product having a viscosity of 36,800 centipoises at 30° C. Similar resins may be prepared by other procedures. The commercial resins and water soluble resin-like wax hereinbefore referred to are readily obtainable.

For solvents, we prefer to employ diethylene glycol, which is relatively inexpensive and affords a satisfactory solvent, but we may utilize ethylene glycol, triethylene glycol, propylene glycol, dipropylene glycol or mixtures of these or their equivalents.

In the following examples, we have included pigments necessary to produce printing inks. The available pigments for such purposes are numerous and cannot be described in detail herein. It is to be understood that in the examples the pigments mentioned are merely illustrative, and that any compatible pigments may be employed, depending upon the color values desired, in accordance with principles well known to the ink maker. This is likewise true with respect to toners which are used customarily by ink makers in the production of ink compositions. In the examples we have referred to zein as an example of the water insoluble resin. It is to be understood that other similar resins such as "Teglac 127" may be employed in place of zein.

*Example I*

Ink was prepared by grinding in the usual mill the ingredients substantially in the following proportions, indicating parts by weight:

| | |
|---|---|
| Lamp black | 26.60 |
| Zein | 6.40 |
| Acetone formadyehyde resin | 25.60 |
| Diethylene glycol | 41.40 |
| | 100.00 |

The zein was introduced as a 25% solution in diethylene glycol, and the acetone formaldehyde resin as a 66.7% solution in the same solvent. The ink has excellent length and flow, and printed impressions dried rapidly when exposed to steam. The dried impression had good binding and was dull and flat. The ink did not set on the press during 100 minutes at a relative humidity of 72.4%.

*Example II*

A similar ink was prepared in the usual manner, including the following ingredients indicated as parts by weight:

| | |
|---|---|
| Black pigment | 19.89 |
| Zein | 6.52 |
| Actone formaldehyde resin | 26.40 |
| Diethylene glycol | 43.21 |
| Paraffin wax | 3.98 |
| | 100.00 |

This ink exhibited properties equivalent to those described in connection with Example I.

*Example III*

Another example of a satisfactory ink composition displaying the desired characteristics consists of the following ingredients ground in the usual manner in the proportions indicated as parts by weight:

| | |
|---|---|
| Black pigment | 19.63 |
| Zein | 4.91 |
| Amberlite PR-14 | 19.88 |
| Diethylene glycol | 51.65 |
| Paraffin wax | 3.93 |
| | 100.00 |

*Example IV*

Another similar ink prepared by a corresponding procedure consists of the following ingredients indicated in parts by weight:

| | |
|---|---|
| Lamp black | 19.52 |
| Blue pigment | 2.08 |
| Amberlite PR-14 | 19.58 |
| Zein | 4.90 |
| Diethylene glycol | 49.90 |
| Paraffin wax | 4.02 |
| | 100.00 |

*Example V*

A slighly modified composition includes the following ingredients indicated as parts by weight:

| | |
|---|---|
| Carbon black | 18.05 |
| Violet pigment | 0.57 |
| Blue pigment | 1.14 |
| Amberlite PR-14 | 17.87 |
| Zein | 4.49 |
| Diethylene glycol | 54.07 |
| Paraffin wax | 3.81 |
| | 100.00 |

*Example VI*

Another similar composition, consisting of the desirable ingredients in slightly different proportions indicated in parts by weight, consists of the following:

| | |
|---|---|
| Lamp-black | 16.40 |
| Carbon black | 3.60 |
| Amberlite PR-28 | 20.00 |
| Zein | 5.00 |
| Diethylene glycol | 51.00 |
| Paraffin wax | 4.00 |
| | 100.00 |

*Example VII*

A solution of a urea-formaldehyde resin in diethylene glycol was prepared as follows: Two hundred grams of Uformite 405 (80 g. resin and 160 g. of water) was diluted with 80 g. diethylene glycol and the water was removed by heating in vacuum. During three hours the temperature was raised slowly to 75° C. while the vacuum was maintained at 6-10 mm. At the end of this operation the product (172 g.) had the following composition:

| | Percent |
|---|---|
| Urea-formaldehyde resin (dry) | 46.5 |
| Diethylene glycol | 46.5 |
| Water | 7.0 |
| | 100.0 |

An ink was made from 40.80 parts by weight of the above solution by grinding with carbon black and 25% zein solution. The ink had the following composition indicated as parts by weight:

| | |
|---|---|
| Carbon black | 20.00 |
| Urea-formaldehyde resin | 19.00 |
| Zein | 4.73 |
| Diethylene glycol | 53.47 |
| Water | 2.80 |
| | 100.00 |

This ink had exceptional length and flow and dried quickly when exposed to steam. The dried films had good finish and binding. This ink was not set by high humidities.

Example VIII

As hereinbefore noted, certain resin-like waxes may be substituted for water soluble resins, notably "Carbowax 4000." The following composition, indicated in parts by weight, illustrates the application of such waxy materials:

| | |
|---|---|
| Black pigment | 20.00 |
| Carbowax 4000 | 20.80 |
| Zein | 9.36 |
| Diethylene glycol | 49.84 |
| | 100.00 |

This ink dried rapidly when impressions on paper were exposed to steam. The ink had good binding and was stable at high humidities, that is to say it did not dry prematurely on the distributing system or on the printing plates.

As hereinbefore indicated, the inks described do not depend upon the principle of precipitating the resin by the application of water in the form of steam, since a large proportion of the resin content is water soluble. Water soluble resins do not, of course, exhibit the low water tolerance which is characteristic of certain resins such as zein and "Teglac 127." The precise mechanism of the drying operation is unknown and cannot be described. Without limiting the invention, we believe that the phenomenon observed is due to the fact that the water soluble resin and the diethylene glycol penetrate the cellulose fibres, leaving the pigment on the surface with only enough resin to bind it tightly to the paper and not enough to cause tackiness. This type of penetration seems to be essentially different from that found in connection with drying-oil inks. In the latter case, the oil seems merely to wet the surface of the cellulose fibre, whereas in the case of solutions of water soluble resins and resin-like waxes, the fibre appears to absorb the liquid, which penetrates the interior thereof. The fact that the mechanism of drying is different from that assumed in connection with resins which are thrown out of solution by water is evidenced by the fact that it is not essential to use steam to effect drying of the inks described herein. Heat at low temperature corresponding to that of the steam will accelerate the drying of the ink in the absence of moisture which may be supplied by the steam. We prefer to use steam because it is a simple and effective means for supplying heat at low temperature to the printed impression.

We have found that combinations of water insoluble resins with water soluble resins and resin-like waxes in a suitable solvent such as diethylene glycol afford an excellent vehicle for the usual pigments employed in the manufacture of printing inks, and that inks prepared in accordance with these principles can be used successfully to avoid the disadvantages of other types of inks as set forth herein. No vapors escape during the drying operation because the inks do not dry by evaporation of the solvent, and the use of high temperatures, as for example steam heated rolls employing steam under pressure, or open flames, are unnecessary in printing practice.

The inks are very stable and do not dry on the distributing system and printing plates for periods of five hours or more under normal conditions. Even under high humidity conditions up to 100% no premature drying has been observed. The inks can be used therefore under pressroom conditions without necessity for frequent washing of the distributing system and printing plates.

We claim:

1. A quick-drying printing ink composition comprising a pigment and a vehicle therefor including zein, a water-soluble resin, and a water-soluble glycol in which the zein and resin are dissolved.

2. A quick-drying printing ink composition comprising a pigment and a vehicle therefor including zein, a water-soluble acetone-formaldehyde resin, and a water-soluble glycol in which the zein and resin are dissolved.

3. A quick-drying printing ink composition comprising a pigment and a vehicle therefor including zein, a water-soluble phenol-formaldehyde resin and a water-soluble glycol in which the zein and resin are dissolved.

4. A quick-drying printing ink composition comprising a pigment and a vehicle therefor including zein, a water-soluble urea-formaldehyde resin, and a water-soluble glycol in which the zein and resin are dissolved.

JOHN W. KROEGER.
HARRY F. O'CONNOR.